United States Patent [19]

Ishikawa et al.

[11] 4,071,135

[45] Jan. 31, 1978

[54] PASSENGER TRANSPORTATION APPARATUS

[75] Inventors: Riichi Ishikawa, Tokyo; Toshio Takase, Inazawa, both of Japan

[73] Assignee: Mitsubishi Denki Kabushiki Kaisha, Tokyo, Japan

[21] Appl. No.: 678,720

[22] Filed: Apr. 20, 1976

[30] Foreign Application Priority Data

Apr. 28, 1975 Japan ................................ 50-51806

[51] Int. Cl.² ................................................ B65G 17/16

[52] U.S. Cl. ...................................... 198/324; 104/18; 104/127; 105/439; 198/321

[58] Field of Search ................ 198/321, 324, 796–801; 187/16; 104/18, 20, 25, 127; 105/439, 458

[56] References Cited

U.S. PATENT DOCUMENTS

| | | | |
|---|---|---|---|
| 851,021 | 4/1907 | Murray | 198/797 |
| 887,652 | 5/1908 | Kiralfy | 104/20 |
| 1,815,738 | 7/1931 | MacDonald | 187/16 |
| 3,403,794 | 10/1968 | Lopez | 198/799 |

*Primary Examiner*—Evon C. Blunk
*Assistant Examiner*—Jeffrey V. Nase
*Attorney, Agent, or Firm*—Wenderoth, Lind & Ponack

[57] ABSTRACT

A plurality of passenger cars are hung at equal intervals along an endless parallel chain and continuously travel in one direction between two horizontal platforms which are vertically spaced from each other and are maintained stationary with respect to the traveling of the cars. Guard plates are pivotably mounted to the outer wall surfaces of each car facing each the adjacent cars so that the plates can be rotated to fill the space between cars. Only when the cars horizontally travel along the platforms do the guard plates swivel to substantially hide spacings between the adjacent cars.

5 Claims, 5 Drawing Figures

PASSENGER TRANSPORTATION APPARATUS

BACKGROUND OF THE INVENTION

This invention relates to a passenger transportation apparatus disposed between a railway station and a location separated away therefrom and more particularly between the ground and a subway station.

Usually escalator systems are provided between the surface and individual subway stations underground. When subway stations are deeper under the surface of the earth, not only the cost of equipment of associated escalators systems but also the space and cost required for tunnels for the escalator systems to be constructed are increased. To avoid these shortcomings, the installation of an elevator system may be proposed, however, since the shaft for an elevator system is low in efficiency of utilization and so on, and an elevator system will be lower than an escalator systems in transport capacity in relationship to both the space occupied thereby and the cost of equipment.

SUMMARY OF THE INVENTION

Accordingly it is a general object of the present invention to eliminate the disadvantages of the prior art practice as above described.

It is an object of the present invention to provide a new and improved passenger transportation apparatus small in ratios of installation space and a cost of equipment to transport capacity.

The present invention accomplishes these objects by the provision of a passenger transportation apparatus which utilizes a pair of first and second platforms vertically spaced away from each other and horizontally extended, and an endless driving chain means connected to a means for continuously driving the endless driving chain means in a predetermined direction. The endless driving chain means includes a pair of horizontal runs horizontally movable in a parallel relationship with and along the platforms respectively and a pair of vertical runs connected across the pair of horizontal runs at both ends and vertically movable between the first and second platforms. A plurality of passenger cars are carried at predetermined equal intervals by the endless driving chain means for movement with the latter, while each of the horizontal runs of the endless driving chain means causes the passenger cars to travel horizontally along the associated platform.

BRIEF DESCRIPTION OF THE DRAWINGS

The present invention will become more readily apparent from the following detailed description taken in conjunction with the accompanying drawings in which.

DESCRIPTION OF THE PREFERRED EMBODIMENT

Figure 1:
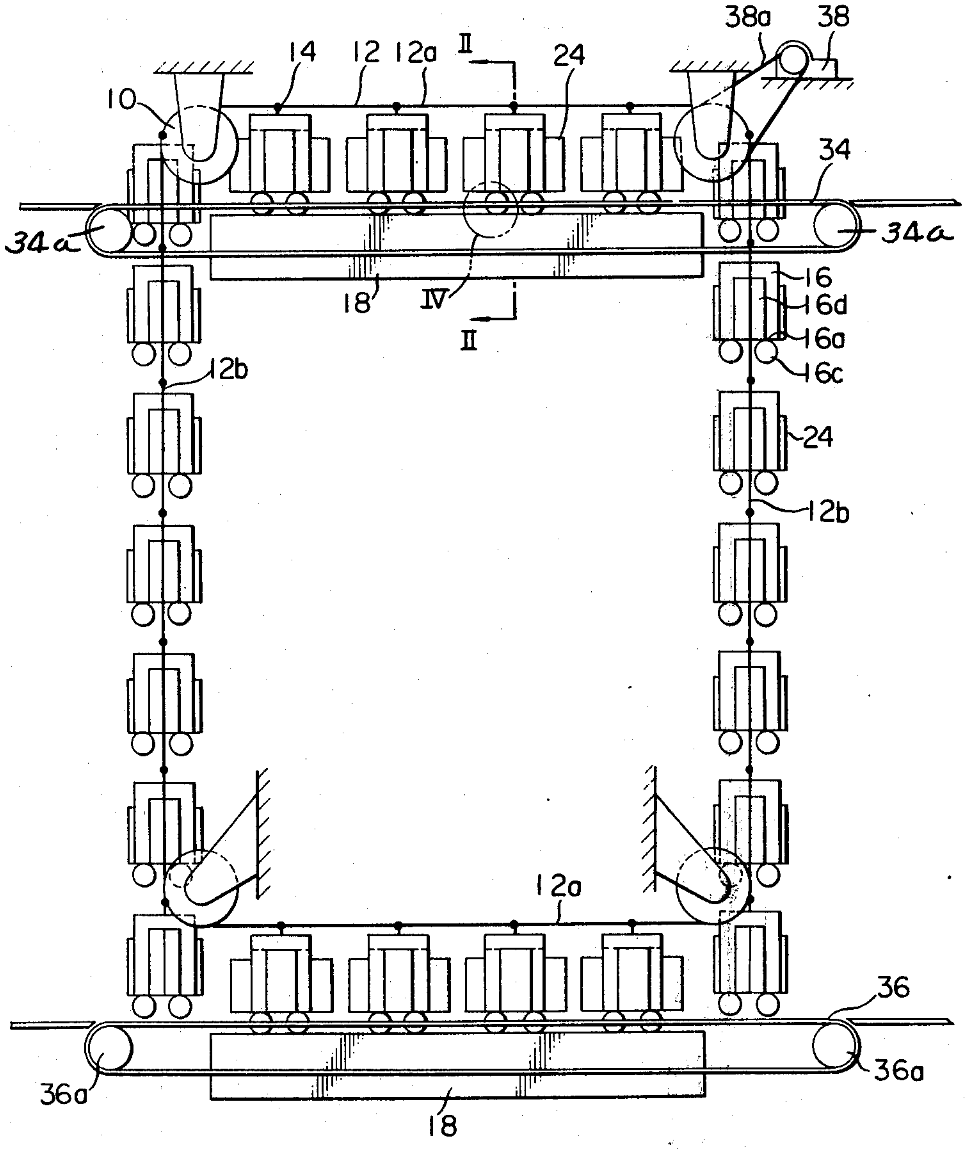
FIG. 1 is a schematic front elevational view of a passenger transportation apparatus constructed in accordance with the principles of the present invention.

Referring now to the drawings and FIG. 1 in particular, it is seen that an arrangement disclosed herein comprises four guide wheels 10 having their centers located at four corners of a rectangle (not shown) respectively and an endless driving chain device 12 trained over the guide wheels 10 to form a pair of upper and lower horizontal runs 12*a* vertically spaced from each other and a pair of right and left vertical runs 12*b* connected across the horizontal runs 12*a* at both ends. Each of the guide wheels 10 is rotatably mounted at a suitable stationary position. The endless driving chain device 12 includes a pair of endless driving chains disposed in a parallel relationship with a predetermined spacing therebetween (see FIGS. 2 and 3) for the purpose as will be apparent hereinafter. Each of the endless driving chains is also designated by the reference numeral 12 and those portions of the endless and driving chains lying in the horizontal and vertical runs are also designated by the reference numerals 12*a* and 12*b* respectively.

Figure 3:
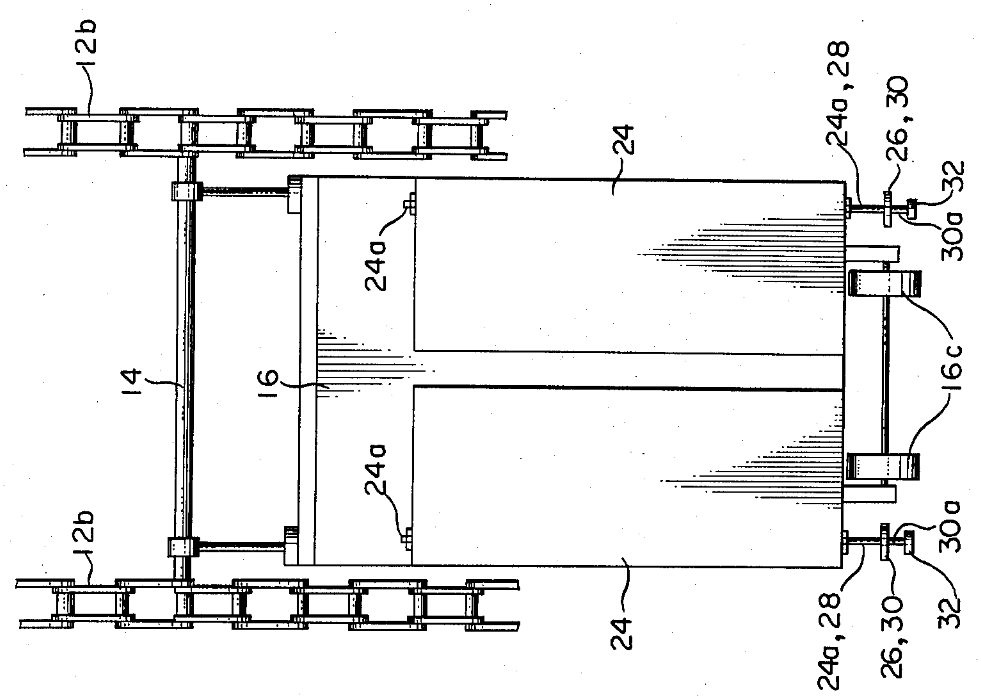
FIG. 3 is a side elevational view of one of the passenger cars when it is traveling in a vertical run of the driving chain means shown in FIG. 1.
Figure 2:
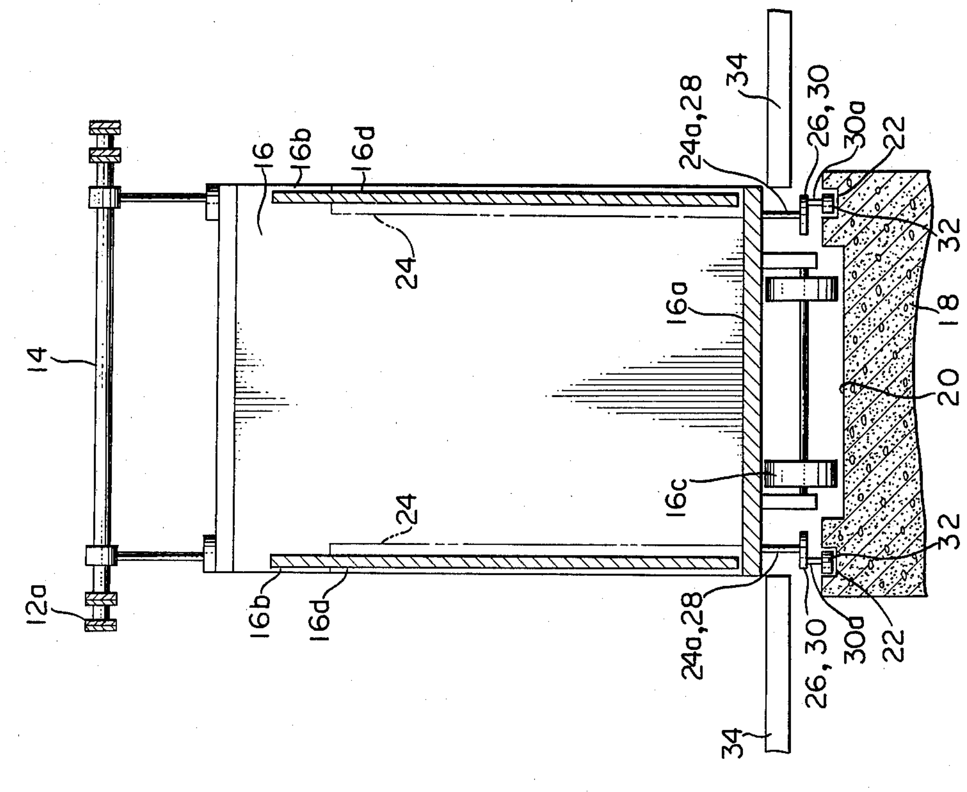
FIG. 2 is a longitudinal sectional view taken along the line II—II of FIG. 1.

The driving chain device 12 has a plurality of supporting rods 14 fixedly carried at predetermined equal intervals by the driving chains 12 which extend thereacross and perpendicularly thereto (see FIGS. 2 and 3). A plurality of passenger cars 16 have their upper portions rotatably hung from the respective supporting rods 14 between the chains 12. Each of the cars 16 includes a floor 16*a*, a pair of opposite doorways 16*b* disposed on a pair of opposite lateral walls of the car 16, front and rear wheels 16*c* rotatably disposed on the underside of the floor 16*a*, and a door 16*d* opening and closing the associated doorway 16*b*.

Figure 5:
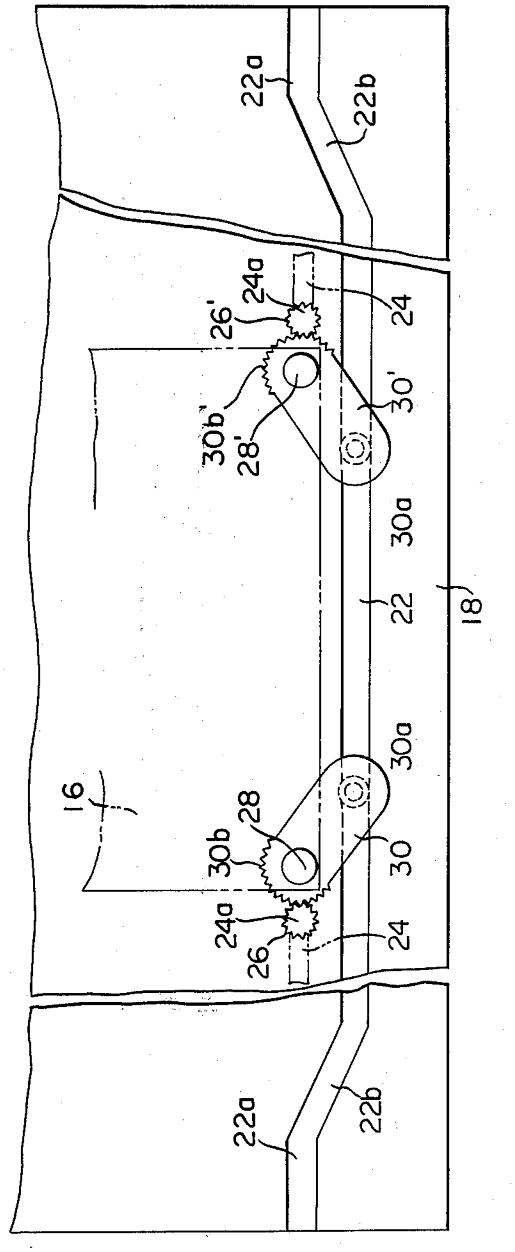
FIG. 5 is a fragmental plan view as viewed in the line V—V of FIG. 4 and in the direction of the arrow shown in the same Figure with the parts above that line illustrated as a phantom line.

As shown in FIG. 1, a track block 18 is disposed below each of the horizontal runs 12*a* of the endless driving chain device 12 and is parallel thereto. It will readily be understood that the upper track block 18 is disposed on the ground and the lower track block 18 is disposed at a subway station underground. Each of the track blocks 18 is provided on the surface thereof facing the driving chain portions 12*a* with a track 20 in the form of a relatively wide recess of U-shaped cross section longitudinally extending throughout the central portion of the surface thereof and a pair of narrow guide grooves 22 extending throughout both lateral edge portions of the recessed surface. Each of the guide grooves 22 includes an intermediate portion parallel to the track 20 and a pair of introduction ports 22*a* opening on the opposite end surfaces of the track block 18 substantially perpendicular to the horizontal run 12*a* of the chain device 12 and connected to the intermediate portion of the groove 22 through a respective connection portion 22*b* tilted to the intermediate portion of the groove 22 as shown in FIG. 5. The guide grooves 22 are located directly below the opposite doorways 16*b* of the passenger cars 16 occupying the horizontal chain run 12*a* and each of the introduction ports 22*a* is positioned nearer the middle of the width of the track block 18 than the intermediate portion of the groove 22.

As best shown in FIG. 3, each of the passenger cars 16 is provided on each of the other pair of opposite lateral walls having no doorway, that is, facing the next adjacent cars with a pair of guard side plates 24. More specifically, the pair of guard side plates 24 is pivotably mounted in opposite relationships to those outer wall surfaces of the car adjacent to the outer edges through respective pivot pins 24*a*. The guard side plate 24 has a retracted position where it substantially abuts against the associated outer wall surface of the car as shown in FIG. 3 and a protracted position as shown in conjunction with the passenger cars traveling along the horizontal chain run 12a in FIG. 1.

Figure 4:
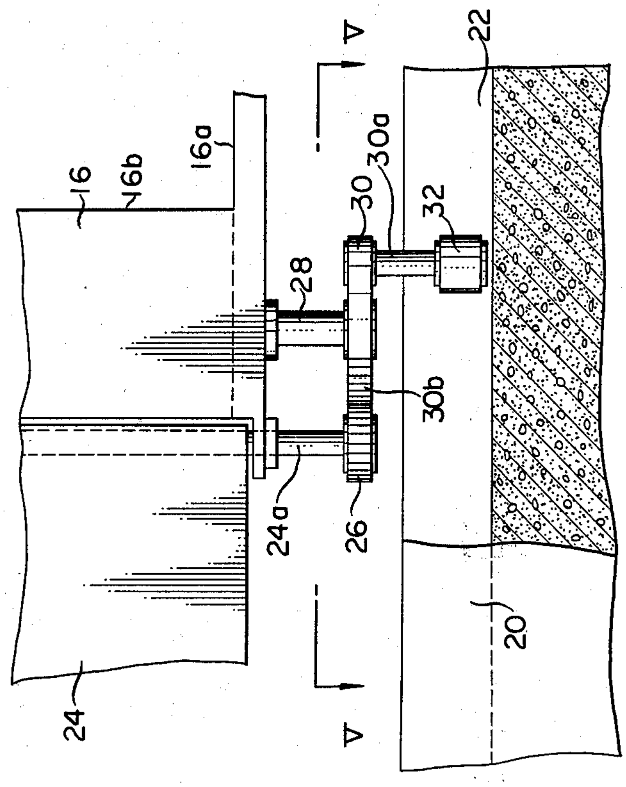
FIG. 4 is a fragmental elevational view, in an enlarged scale, of a portion encircled by dotted circle IV shown in FIG. 1.

As best shown in FIG. 4, a spur gear 26 is fixedly secured to the pivot pin 24a at the lower end and a rod 28 extends from the lower side of the floor 16a of each car 16 adjacent to the mating pivot pin 24 until it terminates at the substantially same level as the pin 24. Then a rocking arm 30 is pivotably mounted at one end portion on the free end of the rod 28 and has at the other end portion a pin 30a extending downwardly as viewed in FIG. 4. The pin 30a has a roller 32 rotatably disposed thereon and adapted to be insert into the associated guide groove 22 on the track block 20 for rolling movement. The rocking arm 30 has at the periphery of the one end portion connected to the rod 28, the pivoted end portion with a sector wheel 30b meshing the spur gear 28.

As seen in FIG. 5, the pivot pin 24a as shown on the righthand portion thereof has operatively coupled thereto replicas of the components 26 through 32 as above described in conjunction with FIG. 4. These components are operatively coupled to the righthand shaft 24a and are designated by the same reference numerals identifying the corresponding components coupled to the lefthand pin 24a, except with a prime, and are mirror images of the corresponding components for the lefthand pin 24, respectively.

Referring back to FIG. 1, the upper horizontal chain run 12a is provided with a first platform 34 or a moving passageway in the form of an endless conveyer spanned between a pair of rolls 34a which is substantially parallel to the surface of the track block 18 and extends from each end of the track block 18. The platform 34 is disposed at either of the doorways of the individual cars 14 as shown in FIG. 2 to form a ground station. Similarly a second platform 36 identical to the first platform 34 is spanned between a pair of rolls 36a to on either side of the lower horizontal chain runs 12a to form a subway station.

In order to drive the endless chain device 12, a driving device 38, such as an electric motor, is disposed at a stationary position to drive the chain device 12 in a predetermined direction by means of an endless belt 38a engaging the motor 38 and one of the guide wheels 10, in this case, the upper righthand wheel 10 as viewed in FIG. 1.

In operation, the driving device 38 is driven to drives the endless chain device 12 at a predetermined speed in a predetermined direction through one of the guide wheels 10, in the example illustrated, the upper righthand wheel 10 as viewed in FIG. 1. Thus, the passenger cars 10 continuously travel at the same speed and in the same direction as the chain device 12 so that they travel horizontally along the upper and lower horizontal runs 12a and vertically along the right and left vertical runs 12b of the chain device 12 in the repeated manner. Each of the first and second platforms 34 and 36, respectively, is moved at the same speed in the same direction as the cars 12 traveling along each of the upper and lower horizontal runs 12a of the chain device 12 by any suitable means (not shown) so that the platforms remain stationary with respect to the horizontalling traveling cars.

As explained above, each of the cars 12 has a pair of guard side plates 24 pivotably mounted in abutting relationship to each of the outer surfaces of the lateral walls thereof which have no doorway. When the passenger cars 12 enter either the upper or lower horizontal chain runs 12a, the wheels 16c roll along the track 20 while the associated front and rollers 32 and 32' are successively inserted into the adjacent introduction ports 22a and then contacted by the wall of the tilted groove portions 22b connected to that ports 22a. This causes the rocking arms 30 and 30' to be rotated in the clockwise and counterclockwise directions as viewed in FIG. 5 respectively whereby the spur gears 26 and 26' are respectively rotated in the counterclockwise and clockwise directions as viewed in FIG. 5. Therefore, the guard side plates 24 are rotated in the opposite directions about the axes of the respective pivot pin 24a until they are stopped at their protracted position where the plates 24 are substantially flush with the plane of the doorway 14b of the car 14 as shown at dotted and dashed line in FIG. 5. At that time, the car 14 has the opposite doorways opened by any suitable means (not shown). Thus a spacing between each pair of the horizontally traveling cars 14 on each side is substantially hidden by the pair of guard side plates 24 in their protracted position while the platform of the moving passageway 34 or 36 is maintained stationary with respect to the traveling cars 14 having the doorways 14b open because the passageway is moving at the same speed in the same direction as the cars. Under these circumstances passengers can safely and easily get into and out of the cars traveling along the horizontal run, and accidents due to passengers incidentally entering the spacings between the cars.

As the cars successively approach the other end of the track block 18, their doorways 14b are successively closed one after another by any suitable means (not shown) and the rollers 32 on the cars successively engage the tilted groove portions 22b on the other end portion of the track block 18 to perform the process as above described in conjunction with the cars entering the horizontal chain run, but in the opposite direction. Thus as each car leaves the horizontal chain run, the guard side plates are returned to their original positions to abutt against the lateral walls thereof. Then, the cars successively enter one of the vertical chain runs 12b until they reach, in succession, the lower or upper horizontal chain runs as the case may be.

The process as above described is repeated along each of the horizontal chain runs to permit the passengers in the cars to get out of them and other persons to get in. Thereafter the cars travel along the other vertical run, one after another. In this way, passengers are transported from one to the other of the platforms 34 and 36.

In the embodiment illustrated one of the doorways of each car may be exclusively used as an entrance while the other doorway maybe used exlusively as an exit, whereby a multitude of passengers are safely transported from one platform to the other in a well-ordered manner.

In summary, the present invention provides a passenger transportation apparatus comprising an endless chain device disposed between a pair of upper and lower platforms. A plurality of passenger cars are carried at predetermined equal intervals by the endless chain device and travel horizontally along each of the platforms at the same speed and in the same direction as the platforms. Further, each of the passenger cars is provided with guard side plates which are operative when the cars travel along either of the horizontal chain runs. When the guard side plates are in their protracted positions, the plates hide over spacings between the adjacent cars.

The present invention has several advantages. For example, the present passenger transportation apparatus can be inexpensively installed within a minimal space. This is because only a shaft through which passenger cars travel along each of the vertical chain runs is required to be constructed. Thus the space and cost required for the installation of the present transportation apparatus can be saved as compared to escalator systems. Also the present transportation apparatus is substantially comparable in transport capacity to escalator systems because a multitude of passenger cars travel in a mated relationship. In addition, the guard side plates insure that passengers will safely get into and out of the cars.

While the invention has been illustrated and described in conjunction with a single preferred embodiment thereof it is to be understood that numerous changes and modifications may be resorted to without departing from the spirit and scope of the present invention. For example, the doors **16*d* on each passenger car 16 may be omitted. Alternatively, any suitable cam means (not shown) may be provided on each of the platforms to automatically open and close the doors 16*d* on those cars only when traveling along each of the platform. Also the wheels 16*c* on each car 16 may be replaced by wheels disposed on either of the supporting rods 14** or on the upper wall of each car and rotatably supported by guide rail means disposed on a stationary portion to extend along each of the horizontal chain runs.

What we claim is:

1. An apparatus for transporting passengers between two vertically spaced positions, said apparatus comprising first and second horizontal track blocks vertically spaced from each other;

a plurality of passenger car means rollable along said first and second track blocks for transporting passengers therein, said passenger car means having at least one open side;

continuous drive chain means connected to said passenger car means and positioned horizontally above and vertically between both of said horizontal track blocks, said chain means being substantially rectangular in overall configuration, for moving said passenger car means connected thereto horizontally along and vertically between said first and second horizontal track blocks;

motor means operatively connected to said chain drive means for continuously driving said chain drive means and said passenger car means connected thereto;

first horizontal moving platform means adjacent and parallel to said first track block on the same side as said opening into said passenger car means on said first track block and movable in the same direction and at the same speed as said passenger car means on said track block for carrying passengers to and from said passenger car means;

second horizontal moving platform means adjacent and parallel to said second track block on the same side as said opening into said passenger car means on said second track block and movable in the same direction and at the same speed as said passenger car means for carrying passengers to and from said passenger car means on said second track block; and rotatable side guard plate means connected to each of said passenger car means and rotatable toward the passenger car means adjacent thereto when said passenger car means are moved horizontally along said track blocks for closing the spacing between said moving passenger car means moving along said track blocks and rotatable toward the passenger car means to which it is connected when said passenger car means is moved vertically on said chain drive means between said first and second horizontal track blocks.

2. An apparatus as claimed in claim 1 wherein:

said first and second horizontal track blocks have first guide grooves running the length thereof; and said side guard plate means has a control means connected thereto which is engageable with said first guide grooves in said first and second horizontal track blocks for rotating said side guard plate means away from said passenger car means to which it is connected toward the passenger car means adjacent thereto when said passenger car means starts to move along said horizontal track blocks and for rotating said guide side plate means toward said passenger means to which it is connected when said passenger car means moves away from said horizontal track blocks.

3. An apparatus as claimed in claim 1 wherein said chain drive means is comprised of:

a plurality of rotatable, stationarily-supported guide wheels above the ends of said first and second horizontal track blocks;

a continuous driving chain around and rotatable with said guide wheels; and a plurality of supporting rods supported at predetermined intervals on said driving chains at one end and rotatably connected to said passenger car means at the other end thereof.

4. An apparatus as claimed in claim 3 wherein said motor means is connected to at least one of said guide wheels.

5. An apparatus as claimed in claim 1 wherein each of said passenger car means is comprised of:

a compartment with at least one open side and a top connected to said chain drive means; and wheels at the bottom of said compartment rollable along said horizontal track blocks.

* * * * *